US009047356B2

(12) United States Patent
Puppin

(10) Patent No.: US 9,047,356 B2
(45) Date of Patent: Jun. 2, 2015

(54) SYNCHRONIZING MULTIPLE READING POSITIONS IN ELECTRONIC BOOKS

(75) Inventor: Diego Puppin, Arlington, MA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 13/604,575

(22) Filed: Sep. 5, 2012

(65) Prior Publication Data
US 2014/0068428 A1 Mar. 6, 2014

(51) Int. Cl.
*G06F 17/30* (2006.01)
(52) U.S. Cl.
CPC ...... *G06F 17/30575* (2013.01); *G09G 2354/00* (2013.01); *G09G 2380/14* (2013.01)
(58) Field of Classification Search
CPC ..... G06F 17/21; G06F 17/211; G06F 17/212; G06F 17/24; G06F 17/243; G06F 17/30; G06F 17/30017
USPC .......................... 715/201, 203, 273, 276, 277
See application file for complete search history.

(56) References Cited

U.S. PATENT DOCUMENTS

| | | | |
|---|---|---|---|
| 6,154,757 A * | 11/2000 | Krause et al. ................. | 715/205 |
| 7,117,231 B2 | 10/2006 | Fischer et al. | |
| 7,270,546 B1 | 9/2007 | Adams et al. | |
| 7,412,643 B1 | 8/2008 | Fischer et al. | |
| 7,748,634 B1 | 7/2010 | Zehr et al. | |
| 8,433,431 B1 | 4/2013 | Master et al. | |
| 8,504,369 B1 | 8/2013 | Chigier et al. | |
| 8,527,859 B2 | 9/2013 | Henshall et al. | |
| 8,548,618 B1 | 10/2013 | Story et al. | |
| 8,904,304 B2 * | 12/2014 | Farago .......................... | 715/776 |
| 2002/0054073 A1 | 5/2002 | Yuen | |
| 2002/0099552 A1 | 7/2002 | Rubin et al. | |
| 2002/0184189 A1 | 12/2002 | Hay et al. | |
| 2003/0013073 A1 | 1/2003 | Duncan et al. | |
| 2003/0203343 A1 * | 10/2003 | Milner ......................... | 434/157 |
| 2004/0175095 A1 * | 9/2004 | Freeman ....................... | 386/46 |
| 2005/0022113 A1 | 1/2005 | Hanlon | |
| 2006/0114757 A1 * | 6/2006 | Theimer et al. ............ | 369/30.01 |
| 2006/0149781 A1 | 7/2006 | Blankinship | |
| 2006/0194181 A1 | 8/2006 | Rosenberg | |
| 2008/0005656 A1 | 1/2008 | Pang et al. | |

(Continued)

FOREIGN PATENT DOCUMENTS

JP   2005-189906 A   7/2005
KR   10-2011-0049981 A   5/2011

(Continued)

OTHER PUBLICATIONS

Bill Gibron; The Simpsons—The Complete Fifth Season; Dec. 21, 2004; DVD Talk; pp. 1-7.*

(Continued)

*Primary Examiner* — Andrew Dyer
(74) *Attorney, Agent, or Firm* — Fenwick & West LLP

(57) ABSTRACT

An electronic book system is configured to allow a user to read a primary portion of an electronic book, then switch to reading a secondary portion of the book, the secondary portion being presented based on a current reading position for the main portion. A reader can repeatedly switch back and forth between primary and secondary portions without losing track of the reader's progress through the book. As an example, a reader in a textbook can immediately switch to a problem set corresponding to the reader's current position in the textbook.

19 Claims, 7 Drawing Sheets

(56) References Cited

U.S. PATENT DOCUMENTS

| | | | |
|---|---|---|---|
| 2008/0027726 | A1 | 1/2008 | Hansen et al. |
| 2009/0047647 | A1 | 2/2009 | Welch et al. |
| 2009/0240671 | A1* | 9/2009 | Torres et al. ............... 707/4 |
| 2010/0050064 | A1 | 2/2010 | Liu et al. |
| 2010/0185932 | A1 | 7/2010 | Coffman et al. |
| 2010/0324895 | A1 | 12/2010 | Kurzweil et al. |
| 2011/0106970 | A1 | 5/2011 | Song et al. |
| 2011/0153047 | A1 | 6/2011 | Cameron et al. |
| 2011/0153330 | A1 | 6/2011 | Yazdani et al. |
| 2011/0177481 | A1 | 7/2011 | Haff et al. |
| 2011/0195388 | A1 | 8/2011 | Henshall et al. |
| 2011/0208614 | A1* | 8/2011 | Tom ..................... 705/27.1 |
| 2011/0231474 | A1 | 9/2011 | Locker et al. |
| 2011/0246175 | A1* | 10/2011 | Yi et al. ................... 704/3 |
| 2011/0288862 | A1 | 11/2011 | Todic |
| 2011/0289444 | A1* | 11/2011 | Winsky .................. 715/776 |
| 2012/0046947 | A1 | 2/2012 | Fleizach |
| 2012/0221968 | A1 | 8/2012 | Patterson et al. |
| 2012/0233539 | A1* | 9/2012 | Reed ..................... 715/234 |
| 2012/0245721 | A1 | 9/2012 | Story et al. |
| 2012/0246343 | A1* | 9/2012 | Story et al. ............. 709/248 |
| 2012/0303643 | A1 | 11/2012 | Lau |
| 2012/0310642 | A1 | 12/2012 | Cao et al. |
| 2012/0310649 | A1 | 12/2012 | Cannistraro et al. |
| 2013/0013991 | A1 | 1/2013 | Evans |
| 2013/0041747 | A1* | 2/2013 | Anderson et al. .......... 705/14.39 |
| 2013/0041978 | A1* | 2/2013 | Ohashi .................... 709/217 |
| 2013/0080471 | A1* | 3/2013 | Forte et al. ............... 707/785 |
| 2013/0130216 | A1 | 5/2013 | Morton et al. |
| 2013/0151974 | A1* | 6/2013 | Cho et al. ................. 715/733 |
| 2013/0191708 | A1* | 7/2013 | Song ...................... 715/202 |

FOREIGN PATENT DOCUMENTS

| | | |
|---|---|---|
| WO | WO 2007/099529 A1 | 9/2007 |
| WO | WO 2012/115853 A2 | 8/2012 |

OTHER PUBLICATIONS

PCT International Search Report and Written for PCT/US2013/056337, Nov. 26, 2013, 9 Pages.

National Information Standards Organization, Specifications for the Digital Talking Book, Apr. 21, 2005, 93 Pages, Can be retrieved from the internet <URL:http://www.niso.org/workrooms/daisy/Z39-86-2005.pdf>.

Shinano Kenshi Co., Ltd., Plextalk Recording Software User Manual, Jul. 2004, 70 Pages, [online] [Retrieved on Oct. 28, 2013] Retrieved from the internet <URL:http://www.plextalk.com/in/download/PLEX_RS_UM_E.html>.

American Printing House for the Blind Inc., Book Wizard Producer User's Manual, Sep. 7, 2010, 41 Pages, Can be retrieved from the internet <URL:http://tech.aph.org/bwp_info.htm>.

The World Wide Web Consortium (W3C), Synchronized Multimedia Integration Language (SM IL 2.1), Dec. 13, 2005, 471 Pages, Can be retrieved from the internet <URL:http://www.w3.org/TR/2005/REC-SMIL2-20051213/>.

PCT International Search Report and Written Opinion, PCT/US2012/052622, Feb. 19, 2013, 9 Pages.

PCT International Search Report and Written Opinion, PCT/US2013/023683, May 13, 2013, 10 Pages.

Damm, D., et al., "SyncTS: Automatic synchronization of speech and text documents," AES 42$^{nd}$ International Conference, Ilmenau, Germany, Jul. 22-24, 2011, pp. 1-10.

Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.

Vignoli, F., et al., "A Text-Speech Synchronization Technique with Applications to Talking Heads," ISCA Archive, Auditory-Visual Speech Processing, Aug. 7-10, 1999, 5 Pages.

Dolphin Computer Access Ltd., EasePublisher, Version 2.1, 2007, 287 Pages, Can be retrieved from the Internet <URL: http://www.yourdolphin.com/manuals/044FMANP210.pdf>.

* cited by examiner

SYNCHRONIZING MULTIPLE READING POSITIONS IN ELECTRONIC BOOKS

BACKGROUND

1. Technical Field

The subject matter described herein generally relates to the field of electronic media and, more particularly, to systems and methods for tracking a reader's progress through corresponding portions of electronic books.

2. Background Information

Electronic book readers, implemented on special-purpose devices as well as on conventional desktop, laptop and handheld computers, have become commonplace. Usage of such readers has accelerated dramatically in recent years. Electronic book readers provide the convenience of having numerous books available on a single device, and also allow different devices to be used for reading in different situations. Systems and methods are known to allow a user's progress through such an electronic book to be tracked on any device the user may have, so that someone reading a book on a smart phone while commuting home on a bus can seamlessly pick up at the correct page when later accessing the electronic book from a desktop computer at home.

Some electronic books have multiple portions that correspond with one another. For instance, some textbooks have chapter-by-chapter problem sets that are at the back of the book, but correspond on a chapter basis with the main body of the book. Other books have problem sets at the back of every chapter that correspond with various sections of the chapter, and still other books have answers to problem sets located in a third portion of a book.

Fictional books sometimes also have such corresponding sections, such as glossaries of characters, time lines, and the like, that track portions of the main text of the book. Both fictional and non-fiction books also sometimes have end notes that correspond with the main text of the book.

It would be advantageous to provide a system and method for simple correlation of these various portions of electronic books to allow readers to efficiently, and without additional navigation, switch among multiple corresponding portions of an electronic book.

SUMMARY

An electronic book system tracks progress in corresponding portions of an electronic book. The system includes a system database storing user progress data, primary book data corresponding to a primary portion and secondary book data corresponding to a secondary portion; the primary book data includes primary position information and the secondary book data includes secondary position information. A correlation data store maintains correlation data indicating correspondence between the primary position information and the secondary position information. First and second display subsystems provide display of the primary portion and the second portion responsive to the user progress data.

In one aspect, the primary portion comprises body text. In other aspects, the secondary portion comprises a glossary, a character list, a problem set, solutions to a problem set, illustrations, commentary relating to the primary portion, or a version of the primary portion presented in a different language.

To obtain the data to allow synchronization between the primary book data and the secondary book data, a system correlates primary position information with secondary position information. The system includes a system database configured to maintain the primary book data and the secondary book data, and a correlation subsystem configured to generate correlation information establishing a correspondence between the primary position information and the secondary position information responsive to comparison of the primary portion and the secondary portion, and to store the correlation information in the system database.

Related methods are also disclosed herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Electronic Book System Overview

Figure 1:
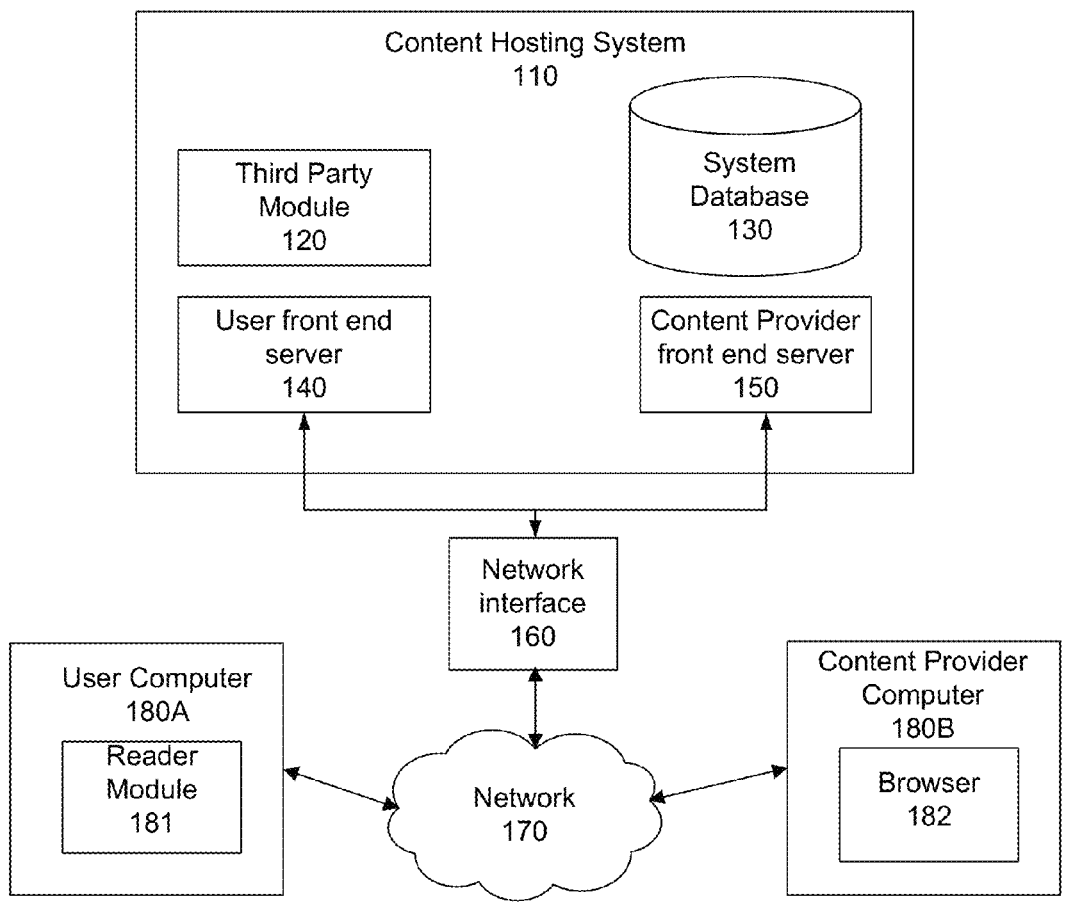
FIG. 1 is a high-level diagram illustrating a networked environment that includes an electronic book reader.

FIG. 1 is a high-level diagram illustrating a networked environment 100 that includes a content hosting system 110. The content hosting system 110 makes available for purchase, licensing, rental or subscription books that can be viewed on user and content provider computers 180 (depicted in FIG. 1, for exemplary purposes only, as individual computers 180A and 180B) using a reader module 181 or browser 182. The content hosting system 110 and computers 180 are connected by a network 170 such as a local area network or the Internet. As further detailed herein, the content hosting system 110 includes audio and text-based versions of an electronic book for the user to access via user computer 180A, as well as subsystems to provide synchronization information for each such version.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

Only a single user computer 180A is shown in FIG. 1, but in practice there are many (e.g., millions of) user computers 180A that can communicate with and use the content hosting system 110. Similarly, only a single content provider computer 180B is shown, but in practice there are many (e.g., thousands or even millions of) content provider computers 180B that can provide books and related materials for content hosting system 110. In some embodiments, reader module 181 and browser 182 include a content player (e.g., FLASH™ from Adobe Systems, Inc.), or any other player adapted for the content file formats used by the content hosting system 110. In a typical embodiment, user computers 180A and content provider computers 180B are implemented with various computing devices, ranging from desktop personal computers to tablet computers, dedicated book reader devices, and smartphones.

User computer 180A with reader module 181 is used by end users to purchase or otherwise obtain, and access, materials provided by the content hosting system 110. Content provider computer 180B is used by content providers (e.g., individual authors, publishing houses) to create and provide material for the content hosting system 110. A given computer can be both a client computer 180A and content provider computer 180B, depending on its usage. The hosting service 110 may differentiate between content providers and users in this instance based on which front end server is used to connect to the content hosting system 110, user logon information, or other factors.

The content hosting system 110 comprises a user front end server 140 and a content provider front end server 150, each of which can be implemented as one or more server class computers. The content provider front end server 150 is connected through the network 170 to content provider computer 180B. The content provider front end server 150 provides an interface for content providers—whether traditional book publishers or individual self-publishing authors—to create and manage materials they would like to make available to users. The user front end server 140 is connected through the network 170 to client computer 180A. The user front end server 140 provides an interface for users to access material created by content providers. In some embodiments, connections from network 170 to other devices (e.g., client computer 180A) are persistent, while in other cases they are not, and information such as reading progress data is transmitted to other components of system 110 only episodically (i.e., when connections are active).

The content hosting system 110 is implemented by a network of server class computers that can in some embodiments include one or more high-performance CPUs and 1G or more of main memory, as well as storage ranging from hundreds of gigabytes to petabytes. An operating system such as LINUX is typically used. The operations of the content hosting system 110, user front end server 140 and content provider front end server 150 as described herein can be controlled through either hardware (e.g., dedicated computing devices or daughter-boards in general purpose computers), or through computer programs installed in computer storage on the servers of the system 110 and executed by the processors of such servers to perform the functions described herein. More detail regarding implementation of such machines is provided in connection with FIG. 4. One of skill in the art of system engineering and, for example, media content hosting will readily determine from the functional and algorithmic descriptions herein the construction and operation of such computer programs and hardware systems.

The content hosting system 110 further comprises a system database 130 that is communicatively coupled to the network 170. The system database 130 stores data related to the content hosting system 110 along with user and system usage information and, in some embodiments, provides related processing (e.g., the correlation functions described herein).

The system database 130 can be implemented as any device or combination of devices capable of storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

The content hosting system 110 is further comprised of a third party module 120. The third party module 120 is implemented as part of the content hosting system 110 in conjunction with the components listed above. The third party module 120 provides a mechanism by which the system provides an open platform for additional uses relating to electronic books, analogous to how an application programming interface allows third parties access to certain features of a software program. In some embodiments, third party input may be limited to provision of content via content provider computers 180B and content provider front end server 150. Given the wide range of possible operation of system 100, however, in some embodiments it may be desirable to open additional capabilities for third parties who are not providing content to access the system. For example, anonymous use data from groups of readers may be made available via third party module 120 to allow development of reading statistics for particular books. In a typical embodiment, the user is provided with various options regarding the information collected and processed as described herein, and the user (or parents, teachers, etc. for younger users) can opt not to have certain information about the user collected or used, if the user would rather not provide such information. The synchronization functions described herein are in some embodiments implemented directly via content hosting system 110 and in other embodiments implemented via third party module 120.

Figure 4:
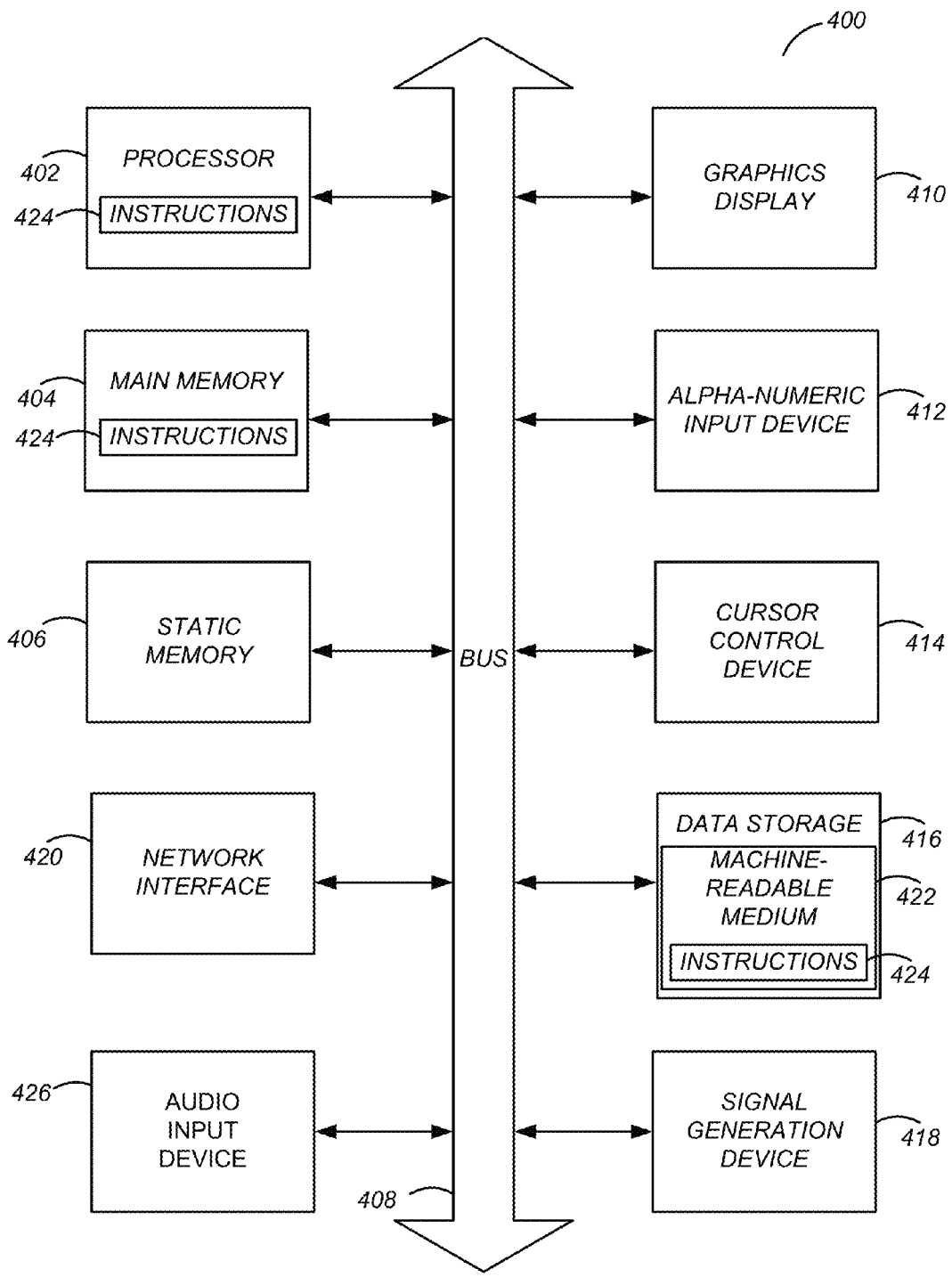
FIG. 4 illustrates one embodiment of components of an example machine able to read instructions from a machine-readable medium and execute them in a processor.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data. FIG. 4 provides further details regarding such components.

Numerous variations from the system architecture of the illustrated content hosting system 110 are possible. The components of the system 110 and their respective functionalities can be combined or redistributed. For example, the system database 130, third party module 120, user front end server 140, and content provider front end server 150 can be distributed among any number of storage devices. The following sections describe in greater detail the reader module 181, system database 130, and the other components illustrated in FIG. 1 in greater detail, and explain their operation in the context of the content hosting system 110.

Reader Module

Figure 2:
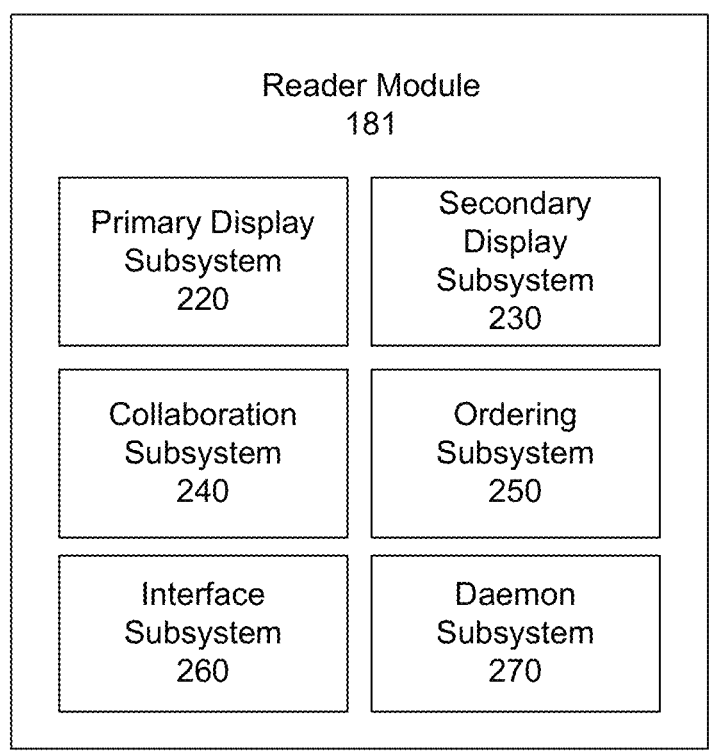
FIG. 2 illustrates a logical view of a reader module used as part of an electronic book reader.

FIG. 2 illustrates a functional view of a reader module 181 used as part of a electronic book system. In the embodiment described above in connection with FIG. 1, the reader module is implemented on user computer 180A, but it should be recognized that in other embodiments, portions discussed herein could also be implemented on other computers (e.g., those in content hosting system 110) that are in communication with reader module 181.

Reader module 181 is configured, in the aspects discussed herein, to address the synchronization features detailed below. As described below, some of these features are interactive and may involve connections to various applications, provision of different types of advertisements, and the like. The features discussed below are social and collaborative as well. For example, while it is typical for only one person to read the body text of a book, multiple people (e.g., those in a study group) might work on a problem set related to a portion of the book at the same time.

Reader module 181 includes various subsystems to facilitate these specialized uses. In the embodiment illustrated in FIG. 2, reader module 181 includes a primary display subsystem 220, a secondary display subsystem 230, a collaboration subsystem 240, an ordering subsystem 250, an interface subsystem 260, and a daemon subsystem 270. Many of these subsystems interact with one another, as described below.

Figure 3:
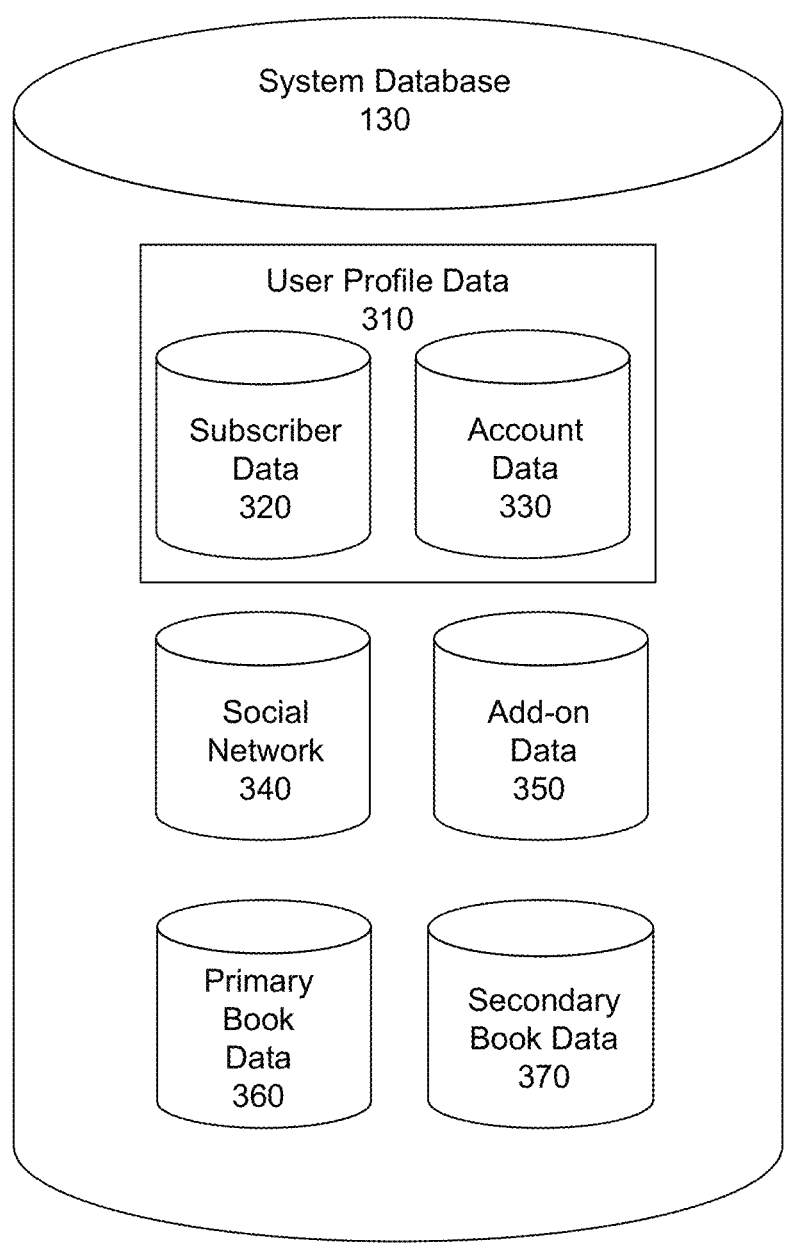
FIG. 3 illustrates a logical view of a system database that stores data and performs processing related to the content hosting system.

Primary display subsystem 220 provides an interface for conventional reading of the main body of an electronic book. In some embodiments, this subsystem also includes facilities for keeping track of a reader's progress, for instance by reporting, through interface subsystem 260, the current page being viewed to a centralized database (e.g., user profile data section 310 of system database 130 as illustrated in FIG. 3). Typically, such facilities can only keep track of reading on a screen-by-screen basis, as the reader pages through the text. In some embodiments, however, other approaches known to those skilled in the art are employed to track a reader's progress with finer granularity, such as by use of gaze analysis from data gathered by a camera integrated in client computer 180A.

Secondary playback subsystem 230 provides related book features that permit the user to switch to a secondary part of the book, e.g., a problem set, that corresponds to the user's progress in the main portion of the book. Various features facilitate such use, including tracking progress through the secondary portion to move forward in the primary portion of the book. In some embodiments, this subsystem also includes facilities for keeping track of a reader's progress, for instance by reporting, through interface subsystem 260, the percentage of completion when the review of the secondary portion ceases (again, for instance, via user profile data section 310 of system database 130 as illustrated in FIG. 3).

Such functionality permits a new type of writing and reading in which the same content can be presented in multiple ways. For example, in many contexts there are multiple ways to present a mathematical concept, and multiple corresponding reading portions as described herein permit a student to approach the subject matter of a chapter in any one of several possible ways. Likewise, the same story may be presented in multiple languages, with students (or other readers) switching whenever they want from one language to another. In yet another example, an author may present a set of occurrences from the points of view of various different characters, and readers can choose to read the account from the perspective of any character they desire. As a further example, an author can provide multiple endings to a mystery, and the user can readily switch among the possibilities without worrying about the reading position for each. Those skilled in the art will recognize other applications of such multiple reading positions in accordance with the disclosure herein.

Further, the term "electronic book" as used herein can apply not only to traditional books, but to other types of content as well, for instance a professor's lecture that may be reviewed in text transcript form on an electronic book reader or in image form from a series of images of the classroom blackboard.

Collaboration subsystem 240 provides various user functions that allow readers to work with others. For example, if several people are in a study group together, they may decide to work on problem sets at the same time or in some other coordinated manner. Collaboration subsystem 240 permits such users to indicate their common activity, via a social network (e.g., social network 340 as maintained in system database 130 of FIG. 3) so that each can keep track of progress through a book. In one embodiment, system 110 prompts each such user to "catch up" by reading portions preceding those that the study group is currently working on. In another embodiment, a "slowest reader" option stops problem set work at the position of the member of the group who has made the least progress through the book, so that no one is working on problem sets corresponding to material they have not read.

Ordering subsystem 250 represents tools that allow readers to obtain electronic books and related materials. In one embodiment, ordering subsystem 250 is implemented as an electronic marketplace (e.g., the ANDROID™ market implemented on the ANDROID™ operating system for smart phones and tablet computers). Third parties offer electronic books and related materials such as character guides, updates, workbooks, and the like. Some of these materials are available for purchase; others are free. In some embodiments, provision via other mechanisms (e.g., subscription, barter, "pay-per-view") is supported, as may be desired by any subset of a reader community or content provider group. In another embodiment, ordering subsystem 250 offers a book in one version (e.g., without problem set solutions) for one price, and in a second version (e.g., with solutions) for a second, somewhat higher, price.

Interface subsystem 260 of reader module 181 also includes user interface tools to facilitate use of electronic books and related features as described herein, such as switching between reading the main body a book and reading secondary and tertiary portions. Reader module 181 is further configured to permit the running of user-selected applications to enhance a reader's ability to work with an electronic book. For instance, a reader may purchase an application that provides solutions for problem sets in a textbook, and the reader initially can be provided with a small portion of the information from that application to see how useful it might be. In addition, reader module 181 includes a daemon subsystem

270 to provide additional add-on features without the reader launching a visible application for such features.

As one example, a reader of a book with many illustrations may have on reader module 181 one or more daemons that allow presentation of those illustrations. In one embodiment those illustrations are presented in real time on user computer 180A; in another embodiment they are sent to the reader for later review, for example by SMS or email. Some older books, in particular, included text-only sections and sections with illustration corresponding to different portions of the text, and those skilled in the art will recognize that the disclosure herein can readily be applied to allow a user to readily switch between a text portion and a corresponding illustration portion of a book while maintaining the integrity of the form of the book as originally published.

System Database

FIG. 3 illustrates a functional view of the system database 130 that stores data related to the content hosting system 110. The system database 130 may be divided based on the different types of data stored within. This data may reside in separate physical devices, or may be collected within a single physical device. System database 130 in some embodiments also provides processing related to the data stored therein.

User profile data storage 310 includes information about an individual user, to facilitate the synchronization, ordering, payment and collaborative aspects of system 100. Subscriber data storage 320 includes identifying information about the user. In some embodiments this is information provided by the user manually, while in other embodiments the user is given an opportunity to agree to the collection of such information automatically, e.g., the electronic books the user has obtained and the social network groups the user has joined. In some embodiments, subscriber data storage 320 also maintains information regarding how far the user has progressed in a particular book—in both the primary and secondary portions. Just as known electronic reader systems (e.g., Google Books) synchronize the user's current reading location in a book so that the user can begin reading on a mobile device while on a bus and continue reading from the correct location on a desktop machine when at home, subscriber data storage 320 keeps track of progress of the user in primary and secondary portions of a book, and does so in a manner that is not solely local to one reading device. Thus, subscriber data storage 320 contains, in some embodiments, data about the user that is not explicitly entered by the user, but which is tracked as the user navigates through books and related materials.

Account data storage 330 keeps track of the user's payment mechanisms (e.g., Google Inc.'s CHECKOUT®) related to the user's ability to obtain content from system 100.

Social network 340 maintains in data storage devices the information needed to implement a social network engine to provide the collaborative features discussed herein, e.g., social graphs, social network preferences and rules that together facilitate communication among readers. In practice, it may be that various distributed computing facilities implement the social networking facilities and functions described herein. For example, certain existing features of the GOOGLE+™ social networking facility can implement some of the functions of social network facility 340. Social network 340 will be used here to reference any facilities to implement the social networking functions discussed herein.

Add-on data storage 350 maintains information for related features. In some embodiments, this includes non-static data relating to books (e.g., usage statistics, book ratings and reviews) and in some embodiments other information (e.g., school class rosters to determine which students will be allowed to obtain free problem sets books that have been partially presented in body text-only form previously).

Primary book data storage 360 stores the main textual content that is provided to users upon their request, such as body text from electronic book files, as well as related information as may be maintained with the main text (e.g., inline illustrations).

Secondary book data storage 370 stores additional content for the book. In one embodiment, secondary data consists of material such as glossaries, maps, problem sets, appendices, tables and the like. In some embodiments this material is automatically provided along with the book, while in others it is provided to users upon their request.

In various embodiments, system database 130 includes other data as well. For providers creating paid books or other content, system database 130 contains billing and revenue sharing information for the provider. Some providers may create subscription channels while others may provide single payment or free delivery of electronic books and related information. These providers may have specific agreements with the operator of the content hosting system 110 for how revenue will flow from the content hosting system 110 to the provider. These specific agreements are contained in the system database 130.

Alternatively, some providers may not have specific agreements with the operator of the content hosting system 110 for how revenue will flow from the content hosting service 110 to the provider. For these providers, system database 130 includes a standardized set of information dictating how revenue will flow from the content hosting system 110 to the providers. For example, for a given partner, the partner data may indicate that the content hosting system 110 receives 25% of the revenue for an item provided in both text-based and audio form as described herein, and the content provider receives 75%. Of course other more complex allocations can be used with variable factors based on features, user base, and the like.

Still further, system database 130 stores synchronization information regarding different versions of an electronic book. In one simple example, each of the primary book data storage 360 and the secondary book data storage 370 are provided with metadata for synchronization purposes, for example a chapter count, page count or word count, depending on the level of synchronization desired. Methods for producing such metadata are described in further detail below.

In one embodiment, conventional mechanisms are used to implement many of the aspects of system database 130. For example, the existing mechanisms from Google Inc.'s BOOKS™ GOOGLE PLAY STORE™, GOGGLES™ GMAIL™, BUZZ™ CHAT™, TALK™, ORKUT™, CHECKOUT™, YOUTUBE™, SCHOLAR™ BLOGGER™ GOOGLE+™ and other products include aspects that can help to implement one or more of storage facilities 310, 320, 330, 340, 350, 360 and 370 as well as modules 220, 230, 240, 250, 260 and 270. Google Inc. already provides eBook readers for ANDROID™ devices (phones, tablets, etc.), IOS™ devices (IPHONES®, IPADS®, and other devices from Apple, Inc.) and various desktop Web browsers, and in one embodiment Google Inc.'s EDITIONS™ and EBOOK-STORE™ eBook-related applications and facilities are modified to provide the functionality described herein.

As mentioned above, user profile data storage 310 is usable on a per-reader basis and is also capable of being aggregated for various populations of subscribers. The population can be the entire subscriber population, or any selected subset thereof, such as targeted subscribers based on any combination of demographic or behavioral characteristics, or content selections. System-wide usage data includes trends and patterns in usage habits for any desired population. For example, correlations can be made between electronic books and add-ons that purchasers of those books choose (presumably related in some way to those books). In one embodiment, when a user obtains a new book, such data are used to recommend other related items the user might also be interested in obtaining Valuation of items, relative rankings of items, and other synthesized information can also be obtained from such data.

Computing Machine Architecture

FIG. 4 is a block diagram illustrating components of an example machine able to read instructions from a machine-readable medium and execute those instructions in a processor. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Synchronization of Portions of an Electronic Book

The process of reading using electronic books opens up potential user experiences that have not been available in the world of paper books. Repeatedly flipping back and forth between body text and corresponding tables, problem sets, illustrations and the like is cumbersome using paper books, but is readily accomplished in the manner disclosed herein.

One feature not previously available in commercial electronic book reader systems is synchronization of a user's progress in different, but corresponding, portions of a work. Such a feature is very important for usability of an electronic book, since a simple static bookmark will not permit the reader to quickly get to the part of an appendix, for instance, that corresponds to the part of the main text the reader just read.

Existing electronic book synchronization methods do not address this need, since they are traditionally based on merely marking a place in one file (typically, marking a page in a text-based file that simply indicates the progress of the reader through the book). Merely noting a "current progress location" does not assist in locating a corresponding location in another portion of the book (e.g., a problem set corresponding to the current progress location). The single-marker approach is even less well suited to situations in which multiple files are used, such as where problem sets for a book are distributed separately from the main body of the book.

Figure 5:
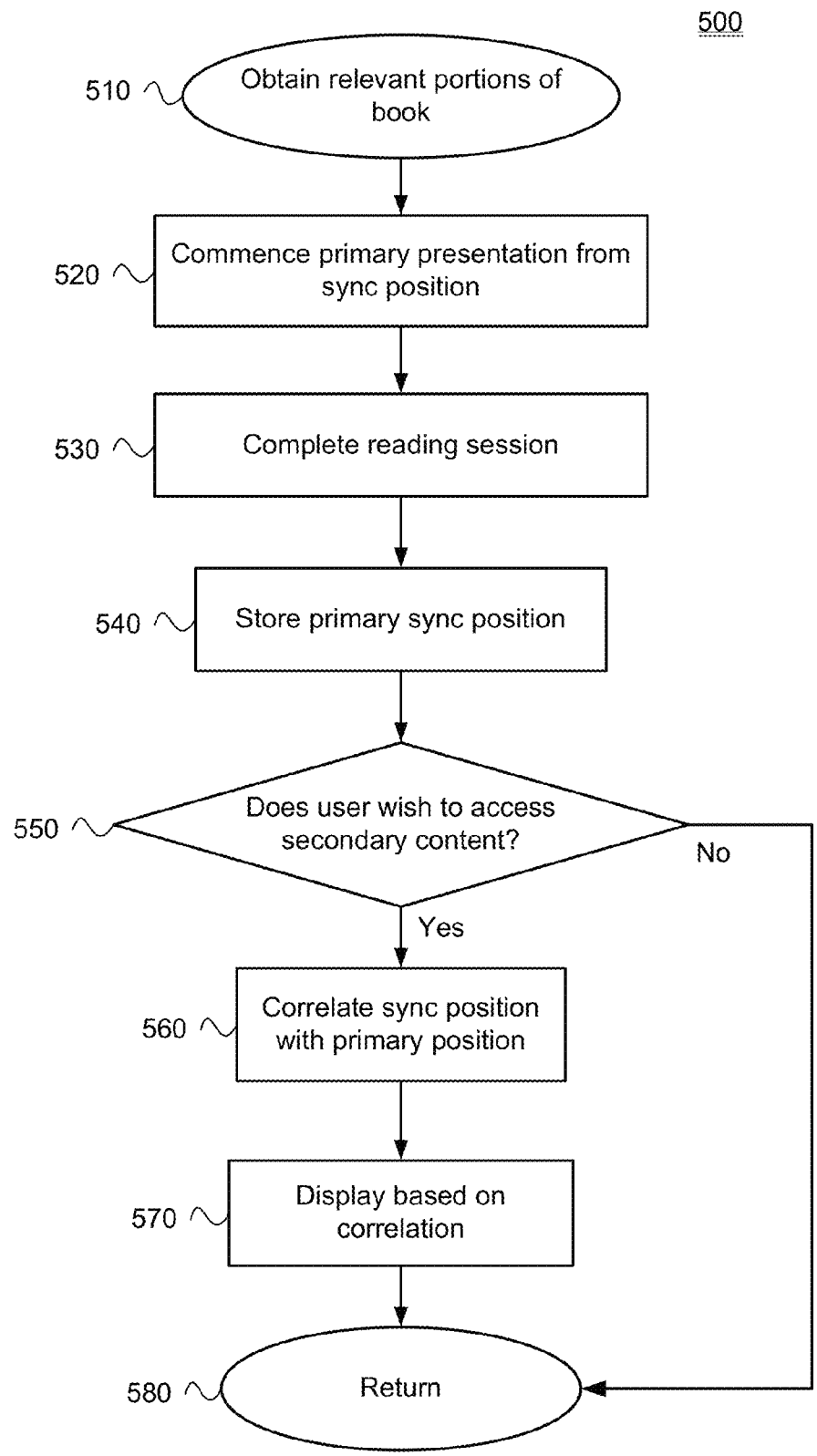
FIG. 5 illustrates one exemplary method of synchronizing portions of an electronic book.

Referring now to FIG. 5, there is shown one embodiment of a method to synchronize presentation of primary and secondary portions of an electronic book to a user. In the example illustrated in FIG. 5, processing begins at step 510 by obtaining relevant portions of a book upon a user request. In some embodiments, this involves loading the entire contents of the book (both primary text sections and secondary/tertiary content) into the reader module 181, while in other embodiments only portions near a current reading position are initially At step 520, processing determines the current sync position for presentation and commences presentation from that position. In the example illustrated in FIG. 5, at step 530, the user completes the reading session, for instance by a user interface control. At that point, the primary content sync position is stored in step 540, for instance by saving the position to subscriber data storage 320 of user profile data storage 310 in system database 130. To provide fail-safe operation should a network interruption occur, in some embodiments the position data is also saved periodically before completion of the playback session, for instance every time the reader progresses to a new screen or page.

When the user next wants to access the book, a check 550 is made to see if the user wishes to access the primary content of the book, i.e., the body text, or some related content such as illustrations, a problem set, or an appendix. If such access request is for the primary content rather than secondary content, processing returns at step 580, since the synchronization position can be obtained conventionally by reference to the position stored in step 540. However, if the request is for the secondary content, processing moves to step 560, in which a correlation is determined between the main reading position and the corresponding secondary position. In one embodiment, this is performed by a simple look-up table correlating the main portion progress (via word count, section number, page number or some other approach consistent with a desired level of granularity) with the secondary content progress (based in this instance on section progress). A portion of a representative table is:

|  | PRIMARY CONTENT (CHAPTER: SECTION) | | | | |
| --- | --- | --- | --- | --- | --- |
|  | 1: A | 1: B | 2: A | 2: B | 2: C |
| SECONDARY CONTENT (PROBLEM SET NUMBER) | 1 | 2 | 3 | 4 | 5 |

In this embodiment, secondary display subsystem 230 is configured to commence display at the beginning of the problem set corresponding to the section that was being read when reading of the primary content stopped. Thus, if the reader stopped midway through chapter 2, section B of the book, then problem set 4 is presented.

In many instances, it may be preferred to allow a reader to continue progress through both primary content and secondary content at the same time. For instance, primary display subsystem 220 may be showing a book's body text in a first display window while at the same time, secondary display subsystem 230 is showing corresponding problem sets in a second display window. In this manner, a student can, for example, see the nature of the problems that will be requested as the student progresses through the body text of the book. However, for purposes of clarity in describing the synchronization process, FIG. 5 illustrates an embodiment in which a user switches from viewing the primary content to viewing the secondary content. Those skilled in the art will recognize additional possible variations, such as more than two sections of a work that are all displayed simultaneously in a synchronized fashion. In order to help provide continuity and context for the reader, in some embodiments synchronization is intentionally offset so that, for instance, a sync pointer for a problem set is only advanced once a user fully completes a section in a chapter, rather than while a user is in the middle of that section.

Generation of the correlation table discussed above is in some embodiments performed based on previously available information. For instance, a great deal of secondary content is expressly described as corresponding to a particular section in a book (such as a problem set that corresponds to chapter 2, section B of a textbook). Likewise, many books have tables of contents with page numbers listed for the start of each chapter as well. If only coarse synchronization is needed, this information can merely be entered directly into a correlation table.

In some cases, however, such correlation may not be available or may be too coarse to provide usable synchronization information. Another method to generate a correlation table is through generation of metadata. In some embodiments, this is performed in a semi-automatic manner, while in others it is fully automatic.

One embodiment for semi-automatic generation of a correlation table involves an analysis of content of secondary data and comparison with primary data. For instance, a trigonometry textbook may include a set of tables for sine, cosine and tangent values. The headers for those tables likely contain words that appear in a concentrated manner in the body text at a particular spot (e.g., the chapter and section in which the sine, cosine and tangent relationships are introduced). In one embodiment, automated content matching techniques known to those skilled in the art are used to determine "best fit" correlations between portions of primary content and portions of secondary content. In a related embodiment, a human administrator (for instance an operator of content provider computer 180B) reviews the automatic correlations and makes adjustments, if needed, to ensure that the correlations are accurate.

Those skilled in the art will recognize that in various environments, it will be sensible to synchronize a reader's progress by different factors, so that in one instance, synchronization may be driven by a reader's progress through the main content only, while in another it is driven through secondary/tertiary content as well. For example, in the case of a trigonometry textbook, it may make little sense to skip forward in the main content simply because a reader happens to look forward in the set of tables and runs across tables for "secant, cosecant and cotangent". However, in a story that is presented in separate windows in two languages, it may be quite sensible to allow progress to be tracked by a reader paging through either the English version or the Spanish version. Variations suitable for other environments will be apparent to those skilled in the art.

Figure 6:
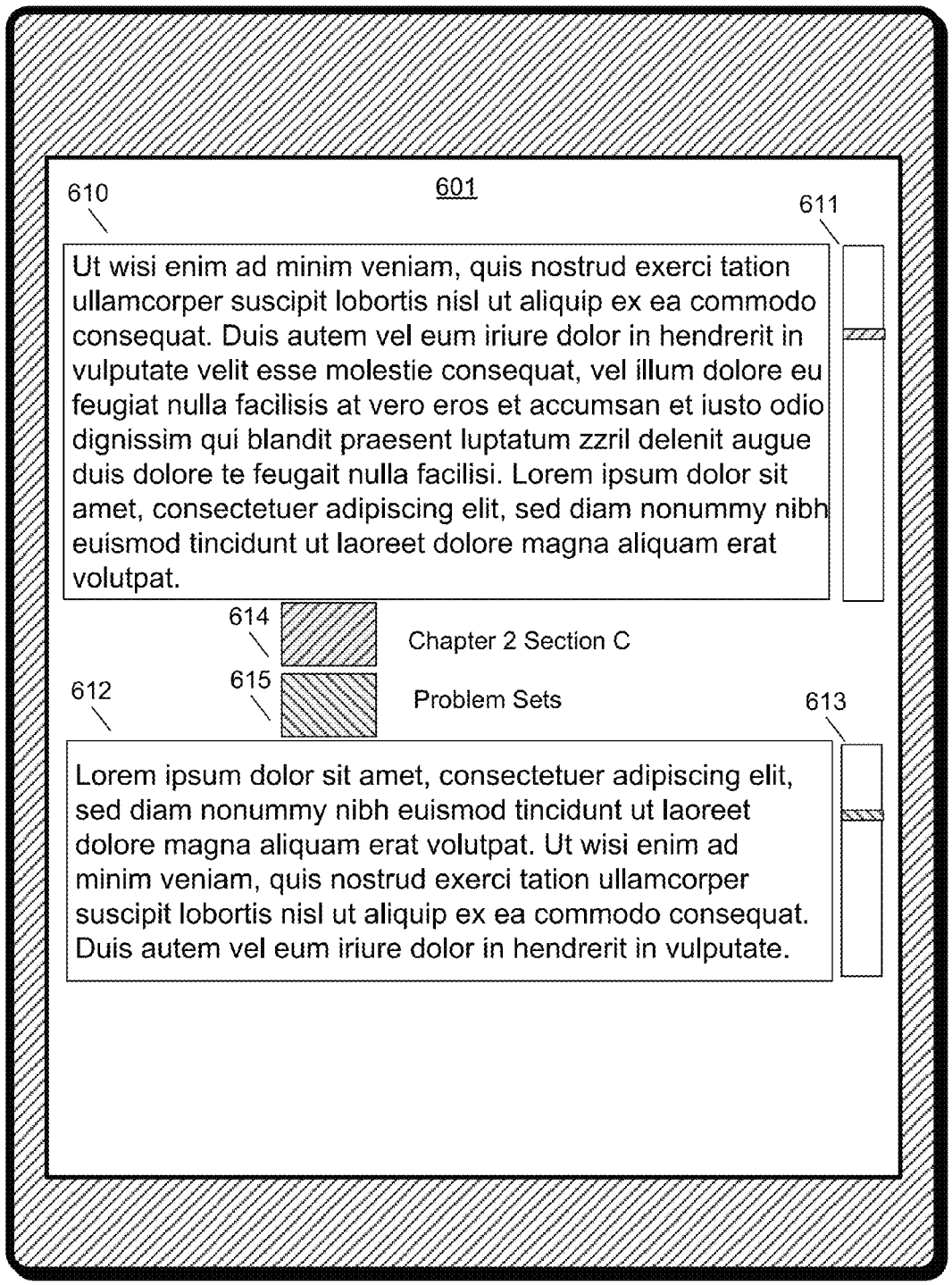
FIG. 6 illustrates a computer configured to provide multiple synchronized reading windows for portions of an electronic book.

Referring now to FIG. 6, there is shown one embodiment of a portable computer 600 (e.g., a tablet computer running the ANDROID™ operating system) with a touch screen 601, configured to allow synchronous reading of two portions of a book as discussed herein. The user interface elements are displayed on the touch screen 601 and interacted with by touching them with a finger or stylus. In other embodiments, the reader interacts with the user interface elements in other manners, for example by clicking on them using a pointing device such as a mouse.

The touch screen 601 has various user controls to permit the reader to perform various functions. Two windows 610 and 611 display primary content and secondary content from an electronic book respectively. Through conventional techniques known to those in the art, the user can page through the book by moving on a screen-by-screen basis through its content. In some embodiments, computer 600 has dedicated page forward and page back buttons (not shown) while in others, such buttons appear as user interface controls (not shown) on touch screen 601. In still other embodiments, a physical movement of computer 600 such as a tap, shake, or abrupt tilt, provides such page forward/back controls.

Two user interface buttons 614, 615, determine whether the "active" window is the primary content (Chapter 2, Section C of the main text in this example) or the secondary content (problem sets in this example). When the primary content screen 610 is selected, a "next page" control results in the next page of the primary content being displayed, which may or may not result in a change in the secondary display 612, depending on the sync correlation that has been established between the primary and secondary content, as discussed above. Likewise, when the secondary content screen 612 is selected by activation of button 612, the reader progresses through the secondary content, with the primary content changing (or not) based on the sync correlation.

Progress bars 611 and 613 show the relative position of each of the primary and secondary content, respectively. As a reader progresses through the primary content, the progress bars 611 and 613 will both move, since the positions are synchronized.

In another embodiment, the relative sizes of windows 610 and 612 are adjustable by the user, such that relatively more display space can be used for the main text than for the problem sets, for instance. In still another embodiment, the main text is provided under one user interface "tab" (appearing as a file folder tab) while another tab corresponds to the problem sets. In this manner the reader can select one tab to have the entire screen filled with the main text and another tab to have the entire screen filled with the problem sets.

In still another embodiment, color coding is used to differentiate main content from secondary (and in some instances tertiary) content. For example, button 614 is colored blue in such an embodiment as is progress bar 611, while button 615 and progress bar 613 are both colored red, to help the user remember that each corresponds to a different portion of the electronic book.

Thus, touch screen 601 provides a dual reading position for the reader in that windows 610 and 612 both track related progress through the book. As mentioned previously, in some embodiments tertiary and potentially even more portions are synchronously tracked in the same manner. A reader can easily jump from the main text to appendix material related to that portion of the text, to problem sets related to that portion of the text, to solutions to those problem sets, all without having to further navigate within those different sections to find the corresponding content.

In some embodiments, a single user interface interaction can both switch the active display and change location in the book. For instance, if the reader has selected secondary content window 612 to be the active window, the reader can both change to the primary content window 610 and move further along in the book simply by moving the progress bar 611 to a lower position.

In a related embodiment, windows 610 and 612 display different versions of an electronic book, such as a student version and a teacher's version, to readily allow for review of differences in content between the two.

By storing the reading positions at a central location (e.g., as part of user profile section 310 in system database 130), a reader can stop using one device for reading and then later start using another device for reading, without losing the progress indications discussed above.

Figure 7:
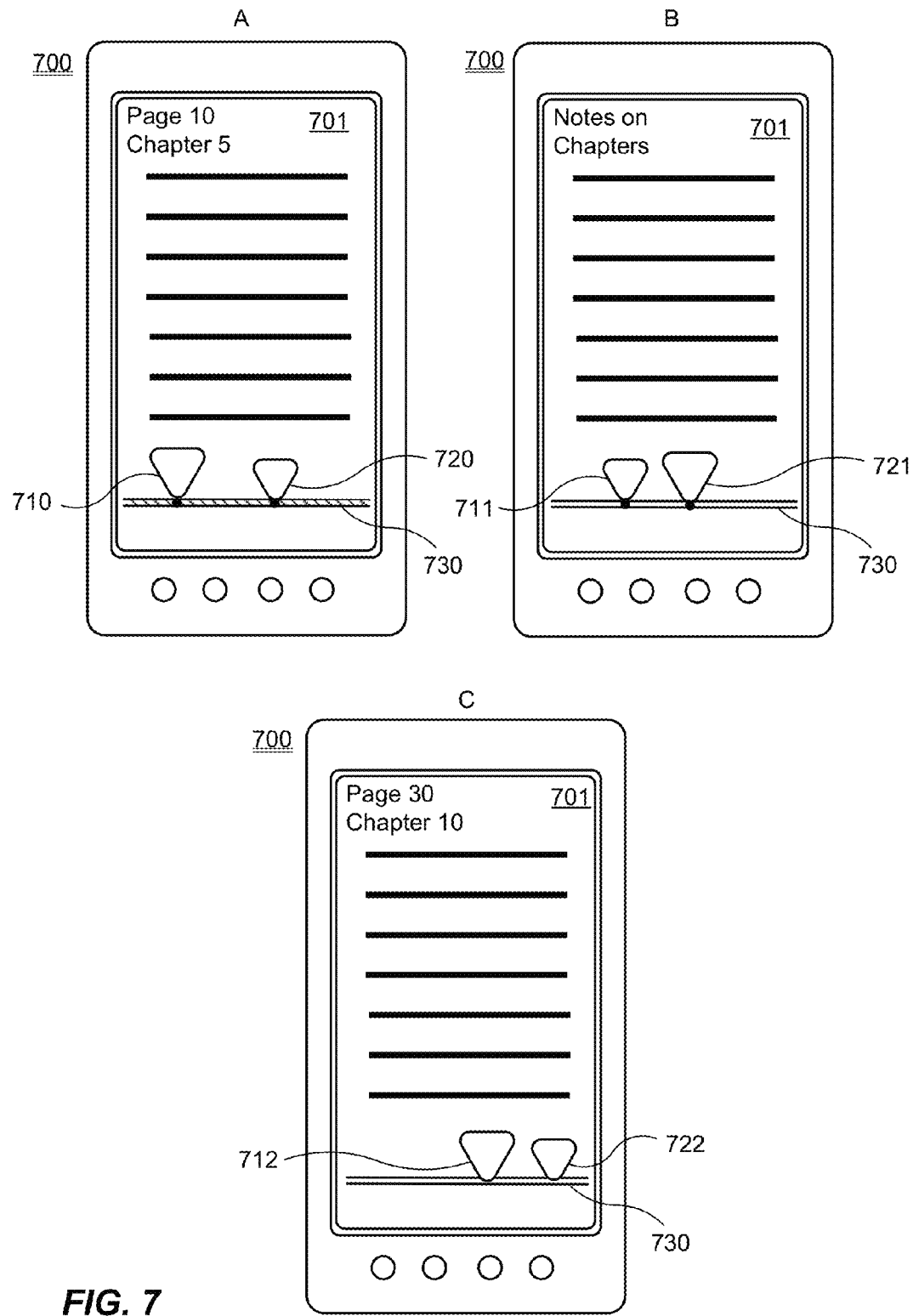
FIG. 7 illustrates another embodiment of a computer configured to provide multiple synchronized reading windows for portions of an electronic book.

Referring now to FIG. 7, there is shown in three different states (A, B and C) another embodiment of a portable computer 700 (e.g., a tablet computer running the ANDROID™ operating system) with a touch screen 701, configured to allow synchronous reading of two portions of a book as discussed herein. As with the embodiment of FIG. 6, the user interface elements are displayed on the touch screen 701.

Also as with the embodiment of FIG. 6, the touch screen 701 has various user controls to permit the reader to perform various functions. Illustrated in FIG. 7 are two position indicators, shown in the three states as 710/711/712 and 720/721/722, respectively. The first indicator 710/711/712 in this instance shows position in the main body text (in state A page 10, chapter 5) and the second indicator 720/721/722 shows corresponding position for ancillary content, in this example an end notes section. In state A, indicator 710 is larger than indicator 720, showing that the screen is currently displaying the text corresponding to indicator 710. If the reader wishes to see notes corresponding to that text, the reader touches indicator 720 to jump to the corresponding location in the notes portion of the book, shown as state B with main text indicator 711 now smaller than notes indicator 721. Should the reader touch smaller indicator 711 without changing position in the notes section, the portable computer 700 will revert to state A.

As the reader progresses through the book, whether in the main body text or in the notes portion, the indicators 710/711/712 and 720/721/722 shift position along progress bar 730.

Thus, as shown in state C, once the reader has progressed in the body text from chapter 5 to chapter 10, the main text indicator 712 is further to the right along progress bar 730 than the main text indicator 710 was when the reader was in chapter 5 (state A). Likewise, the notes indicator 722 has shifted to the right compared with state A, since the notes corresponding with chapter 10 are closer to the end of the book than the notes corresponding with chapter 5. The relative positioning between the main text indicator 710/711/712 and the notes indicator 720/721/722 may change as reading progresses, for example if there is a large notes section for one chapter and a smaller notes section for another chapter.

As with the embodiment shown in FIG. 6, indicators 710/711/712 and 720/721/722 are in some embodiments color coded (e.g., blue for main text and red for notes, respectively) and in some embodiments an indication of whether main text or notes are currently being displayed can also be provided by such color coding (e.g., by coloring progress bar 730 blue when main text is shown (states A, C) and red when notes text is shown (state B)).

In addition to showing the user the two reading positions, in one specific embodiment the user can also change reading position quickly by dragging one of the indicators 710/711/712 or 720/721/722 to quickly move to another place in the book.

Generally speaking, the embodiments discussed above permit enhancement of a user experience with electronic media by the display of correlated primary and secondary content of an electronic book using existing computing devices such as laptop computers and smart phones.

It should be noted that although the discussion herein has centered on correlating primary and secondary content of the same book, those skilled in the art will readily recognize that these techniques can be used to help synchronize other experiences with electronic media as well. For instance, a reader may wish to read both a Shakespeare play and an in-depth commentary on the play. Through use of correlation tables, metadata, third party modules and daemon subsystems as described herein, synchronization information from one document can be applied to the other, allowing a seamless reading experience for a user accessing both the play and the commentary in an integrated manner.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for synchronizing multiple reading positions in an electronic book through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-based system to synchronize progress in primary and secondary portions of an electronic book, comprising:
    a database configured to maintain user progress data and primary book data corresponding to the primary portion and secondary book data corresponding to the secondary portion, the primary book data including primary position information and the secondary book data including secondary position information, and wherein the secondary portion contains at least some data not present in the primary portion;
    a correlation data store configured to maintain correlation data indicating correspondence between the primary position information and the secondary position information, generation of the user progress data being based on the correlation data; and
    a display configured to present a user progress indicator responsive to the user progress data, the user progress indicator comprising a first element indicating a current position in the primary portion and a second element indicating a corresponding position in the secondary portion, the display further configured to present the primary portion at the current position and replace presentation of the first portion with presentation of the second portion at the corresponding position responsive to user-selection of the second element, and wherein the display is further configured to replace presentation of the secondary portion with presentation of the primary portion at the current position responsive to user-selection of the first element.

2. The system of claim 1, wherein the primary portion comprises body text.

3. The system of claim 1, wherein the secondary portion comprises a glossary.

4. The system of claim 1, wherein the secondary portion comprises a character list.

5. The system of claim 1, wherein the secondary portion comprises a problem set.

6. The system of claim 1, wherein the secondary portion comprises solutions to a problem set.

7. The system of claim 1, wherein the secondary portion comprises illustrations.

8. The system of claim 1, wherein the secondary portion comprises commentary relating to the primary portion.

9. The system of claim 1, wherein the secondary portion comprises a version of the primary portion presented in a different language.

10. A computer-implemented method of synchronizing progress in primary and secondary portions of an electronic book, comprising:
    maintaining in a system database user progress data and primary book data corresponding to the primary portion and secondary book data corresponding to the secondary portion, the primary book data including primary position information and the secondary book data including secondary position information, and wherein the secondary portion contains at least some data not present in the primary portion;
    maintaining, in a correlation data store, correlation data indicating correspondence between the primary position information and the secondary position information;
    generating the user progress data responsive to the correlation data;
    presenting a user progress indicator responsive to the user progress data, the user progress indicator comprising a first element indicating a current position in the primary portion and a second element indicating a corresponding position in the secondary portion;
    presenting the primary portion at the current position; and
    replacing presentation of the primary portion with presentation of the secondary portion at the corresponding position responsive to user-selection of the second element, wherein the display is further configured to replace presentation of the secondary portion with presentation of the primary portion at the current position responsive to user-selection of the first element.

11. The method of claim 10, wherein the primary portion comprises body text.

12. The method of claim 10, wherein the secondary portion comprises a glossary.

13. The method of claim 10, wherein the secondary portion comprises a character list.

14. The method of claim 10, wherein the secondary portion comprises a problem set.

15. The method of claim 10, wherein the secondary portion comprises solutions to a problem set.

16. The method of claim 10, wherein the secondary portion comprises illustrations.

17. The method of claim 10, wherein the secondary portion comprises commentary relating to the primary portion.

18. The method of claim 10, wherein the secondary portion comprises a version of the primary portion presented in a different language.

19. A non-transitory computer readable medium having computer readable instructions for synchronizing progress in primary and secondary portions of an electronic book, comprising:
    maintaining in a system database user progress data and primary book data corresponding to the primary portion and secondary book data corresponding to the secondary portion, the primary book data including primary position information and the secondary book data including secondary position information, and wherein the secondary portion contains at least some data not present in the primary portion;

maintaining, in a correlation data store, correlation data indicating correspondence between the primary position information and the secondary position information;

generating the user progress data responsive to the correlation data;

presenting a user progress indicator responsive to the user progress data, the user progress indicator comprising a first element indicating a current position in the primary portion and a second element indicating a corresponding position in the secondary portion;

presenting the primary portion at the current position; and replacing presentation of the primary portion with presentation of the secondary portion at the corresponding position responsive to user-selection of the second element, wherein the display is further configured to replace presentation of the secondary portion with presentation of the primary portion at the current position responsive to user-selection of the first element.

* * * * *